(12) United States Patent
Fukushima et al.

(10) Patent No.: US 9,518,843 B2
(45) Date of Patent: Dec. 13, 2016

(54) FLANGE AND RESOLVER ASSEMBLY

(71) Applicant: MINEBEA CO., LTD., Kitasaku-gun, Nagano (JP)

(72) Inventors: Ryo Fukushima, Fukuroi (JP); Toshinori Chino, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 280 days.

(21) Appl. No.: 14/220,918

(22) Filed: Mar. 20, 2014

(65) Prior Publication Data

US 2014/0340079 A1    Nov. 20, 2014

(30) Foreign Application Priority Data

May 16, 2013   (JP) .................................. 2013-104025

(51) Int. Cl.
   *G01D 5/20*   (2006.01)
   *H02K 24/00*  (2006.01)
(52) U.S. Cl.
   CPC ............ *G01D 5/2053* (2013.01); *H02K 24/00* (2013.01)
(58) Field of Classification Search
   None
   See application file for complete search history.

(56) References Cited

U.S. PATENT DOCUMENTS

| 8,664,949 | B2* | 3/2014 | Takei | ........................ | G01B 7/30 324/207.25 |
| 2008/0024021 | A1* | 1/2008 | Tsukashima | ......... | G01D 5/2046 310/68 D |
| 2011/0031850 | A1* | 2/2011 | Nakamura | ............. | H02K 5/225 310/68 B |
| 2012/0200202 | A1* | 8/2012 | Asai | ................... | H02K 11/0031 310/68 B |

(Continued)

FOREIGN PATENT DOCUMENTS

JP    2001-339904 A    12/2001
JP    A-2003-023761    1/2003

(Continued)

OTHER PUBLICATIONS

Kanetani JP 2010187460 "Servo Unit", English Machine Translation, Published Aug. 26 2010.*

(Continued)

*Primary Examiner* — Melissa Koval
*Assistant Examiner* — Felicia Farrow
(74) *Attorney, Agent, or Firm* — Oliff PLC

(57) ABSTRACT

A resolver has a structure in which the resolver is attached to a flange by press-fitting and in which strong stress that affects an angle detecting accuracy of a stator of the resolver is not applied. The flange, in which a resolver is press-fitted, includes a cylindrical portion in which a stator of the resolver is press-fitted to the inside thereof, and a tabular portion which is larger than an outer diameter of a cylindrical portion viewed from an axial direction and which is (Continued)

integrated with the cylindrical portion, wherein a clearance portion having an expanded inner diameter which does not contact with an outer periphery of the stator of the resolver is provided on an overlapped portion of a cylindrical portion viewed from a vertical direction to the axis and the tabular portion.

5 Claims, 3 Drawing Sheets

(56) References Cited

U.S. PATENT DOCUMENTS

| | | | | |
|---|---|---|---|---|
| 2013/0162243 A1* | 6/2013 | Ochiai | ................ | G01D 5/2046 324/207.16 |
| 2014/0084758 A1* | 3/2014 | Ochiai | ................... | H02K 24/00 310/68 B |

FOREIGN PATENT DOCUMENTS

| | | | |
|---|---|---|---|
| JP | 2005-076730 A | 3/2005 |
| JP | A-2006-094582 | 4/2006 |
| JP | 2007-071827 A | 3/2007 |
| JP | 2010-187460 A | 8/2010 |
| JP | 2013-027122 A | 2/2013 |
| WO | 2008117728 A1 | 10/2008 |

OTHER PUBLICATIONS

Aug. 25, 2016 Office Action issued in Japanese Patent Application No. 2013-104025.

* cited by examiner

FLANGE AND RESOLVER ASSEMBLY

BACKGROUND OF THE INVENTION

Field of the Invention

The present invention relates to a structure in which a resolver is attached to a flange.

Description of Related Art

For example, a resolver is used for detecting a rotation angle of a rotating part in an apparatus. At this time, a stator of the resolver is fixed to a housing of the apparatus, etc. Generally, a standard resolver is prepared; however, there are various types of apparatus for fixing the resolver. Thus, the resolver is mounted to the apparatus by fixing the resolver to the flange and fixing the flange to the apparatus. As a structure for fixing the resolver to the apparatus, etc., for example, techniques described in Japanese Unexamined Patent Application Laid-open No. 2006-94582 and Japanese Unexamined Patent Application Laid-open No. 2003-23761 are known.

In the case in which the resolver is fixed to the flange by press-fitting, measuring accuracy of the resolver is often decreased by fixing to the flange. In the following, this point will be explained.

For example, a VR (valuable reluctance) type resolver has a ring-shaped stator and a rotor arranged on the inside of the stator. Here, the stator has multiple salient poles that protrude inwardly to the axial center and are arranged along a circumferential direction, and an exciting coil, a sine phase detecting coil and a cosine phase detecting coil are wound around these salient poles. The rotor is made of magnetic material, and poles that protrude in a radial direction are provided. When the rotor rotates, a distance between each coil and the rotor surface periodically changes, a length of magnetic path between the cosine phase detecting coil and a length of magnetic path between the exciting coil and the sine phase detecting coil change due to the distance change, a sine phase output waveform from the sine phase detecting coil and a cosine phase output waveform from the cosine phase detecting coil change due to the lengths, and these waveform changes are detected. Then, change of a rotation angle of the rotor is calculated from the sine phase output waveform and the cosine phase output waveform.

In addition, in a structure in which the resolver is simply fixed to the flange by press-fitting, strong stress is applied to the stator in an axial center direction with the press-fitting, and a deformation is generated in the stator. A magnetic path is formed on the inside of the stator; however, when the deformation is generated, it affects a magnetic path length or a magnetic resistance in the stator. Due to this effect, angle detecting accuracy of the resolver is deteriorated According to the above reason, there is a problem in that the angle detecting accuracy is decreased when attaching to an apparatus, even if quality as a product of the resolver itself is ensured. In view of such circumstances, it is an object of the present invention to provide a resolver having a structure in which a resolver is attached to a flange by press-fitting and in which strong stress that affects an angle detecting accuracy of a stator of the resolver is not applied.

SUMMARY OF THE INVENTION

A first aspect of the present invention has a flange in which a resolver is press-fitted, including: a cylindrical portion in which a stator of the resolver is press-fitted to the inside thereof, and a tabular portion that is greater than an outer diameter of a cylindrical portion viewed from an axial direction and that is integrated with the cylindrical portion, wherein a clearance portion having an expanded inner diameter that does not contact with an outer periphery of the stator of the resolver is provided on an overlapped portion of a cylindrical portion viewed from a vertical direction to the axis and the tabular portion.

There is no room for deformation since the clearance portion has a tabular portion at an outer side thereof (a direction separated from the axial center), and when the resolver is press-fitted to this portion, excessive stress is applied to the stator of the resolver. According to the first aspect of the present invention, since the clearance portion does not contact with the stator of the resolver, the problem that the excessive stress of the stator of the resolver is applied can be avoided. Here, the axis means a rotating axis of the resolver.

A second aspect of the present invention has the flange according to the first aspect, in which a length in an axial direction of the clearance portion is greater than a thickness of the tabular portion. According to the second aspect of the present invention, an effect that the excessive stress of the stator of the resolver is not applied can be ensured.

A third aspect of the present invention has the flange according to the first aspect, in which a chamfered guide portion is formed on an inner periphery of an opposite end of the cylindrical portion to a portion in which the clearance portion is provided. According to the third aspect of the present invention, the press-fitting to the cylindrical portion of the resolver can be smoothly carried out by the guide portion.

A fourth aspect of the present invention has the flange according to the first aspect, in which the clearance portion has a tapered shape in which an inner diameter gradually decreases in an extending direction of the cylindrical portion.

A fifth aspect of the present invention has the flange according to the first aspect, in which the clearance portion has an R surface shape.

A sixth aspect of the present invention has the flange according to the first aspect, in which the clearance portion has an enlarged diameter structure in which an inner diameter is a fixed value in an extending direction of the cylindrical portion.

A seventh aspect of the present invention has a resolver assembly, including: a flange according to the first aspect, and a resolver, wherein a stator of the resolver is press-fitted to the inside of the cylindrical portion.

According to the present invention, a resolver having a structure in which a resolver is attached to a flange by press-fitting and strong stress which affects an angle detecting accuracy of a stator of the resolver is not applied, can be provided.

PREFERRED EMBODIMENTS OF THE INVENTION

Figure 1:
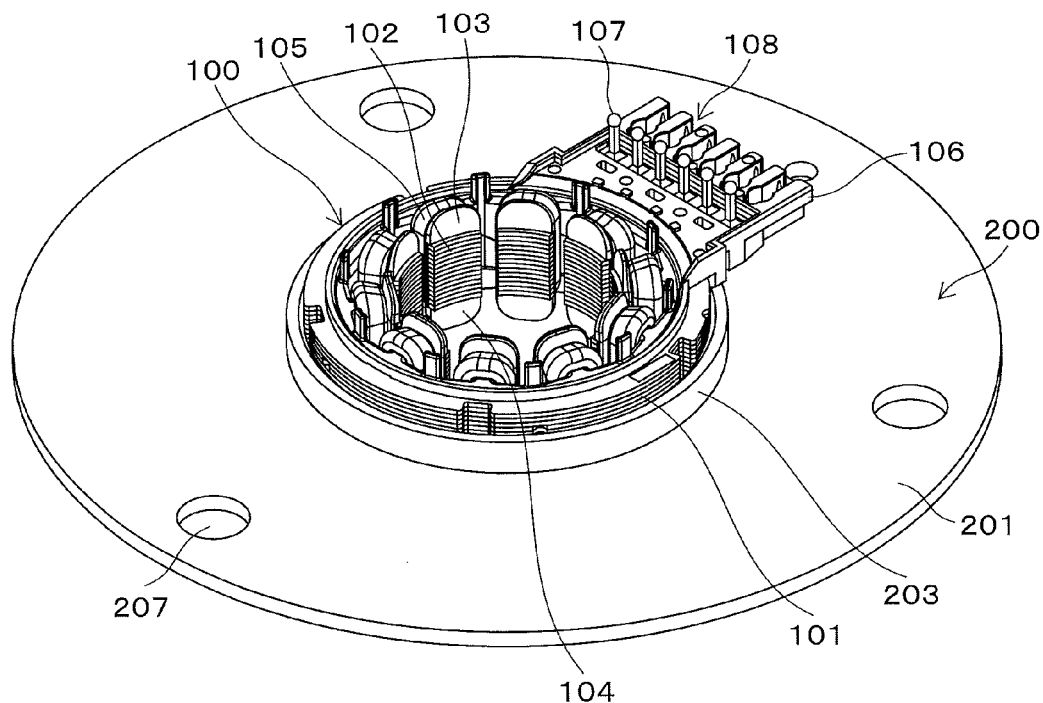
FIG. 1 is a perspective view showing a resolver in which a flange is attached according to an embodiment of the present invention.

FIG. 1 shows a state in which a VR resolver 100 is attached to a flange 200 by press-fitting. The resolver 100 has a ring-shaped stator 101. The stator 101 has a structure in which multiple tabular magnetic materials (electromagnetic steel sheets, etc.) processed in a ring shape are laminated in an axial direction. On the inside (an axial center side) of the stator 101, multiple salient poles 102 that protrude toward an axial center direction are arranged along a circumferential direction. In an example shown in FIG. 1, ten salient poles are arranged at equal intervals along a circumferential direction.

Each salient pole 102 is covered from front and back of an axial direction (top and bottom of the figure) by insulators 103,104 made of resin, respectively. Each salient pole 102 is wound over the insulators 103,104 by wire to form a coil 105. At least one of an exciting coil, a sine phase detecting coil and a cosine phase detecting coil is formed by the coil 105. For example, the exciting coils are wound around all of the ten salient poles 10, and the sine phase detecting coils and the cosine phase detecting coils are alternately provided. Here, this is an example, and the number of salient poles and configuration of the coils are not limited to the structure described above.

A terminal block 106 made of resin is attached to the stator 101. Six metallic terminal pins 107 are arranged in the terminal block 106. Lead wires (not shown) led from the exciting coils, the sine phase detecting coils and the cosine phase detecting coils are connected with the terminal pins 107, respectively. The terminal block 106 has a connector portion 108. The connector portion 108 has an electrode, and the terminal pins 107 are electrically connected with this electrode. A wire from the outside is connected with the connector portion 108. Supply of the exciting current to the VR type resolver 100, and output to the outside of a sine phase detecting signal and a cosine phase detecting signal from the VR type resolver 100, are carried out through the connector portion 108.

A rotor (not shown) is arranged on the inside of the stator 101. The rotor is held in a rotatable condition for the stator 101. The rotor has a structure in which multiple magnetic materials (for example, an electromagnetic steel sheet) are laminated in an axial direction. The rotor has multiple portions (poles) that protrude in a radial direction. The shape and the structure of the rotor are similar to those of a rotor in a usual VR type resolver.

Figure 2:
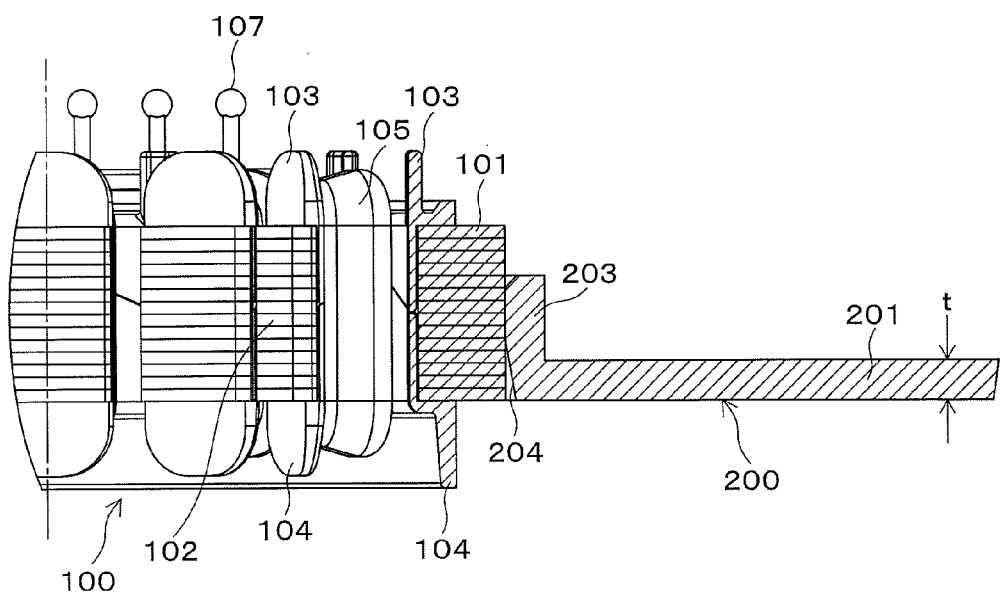
FIG. 2 is a cross sectional view of FIG. 1.
Figure 3:
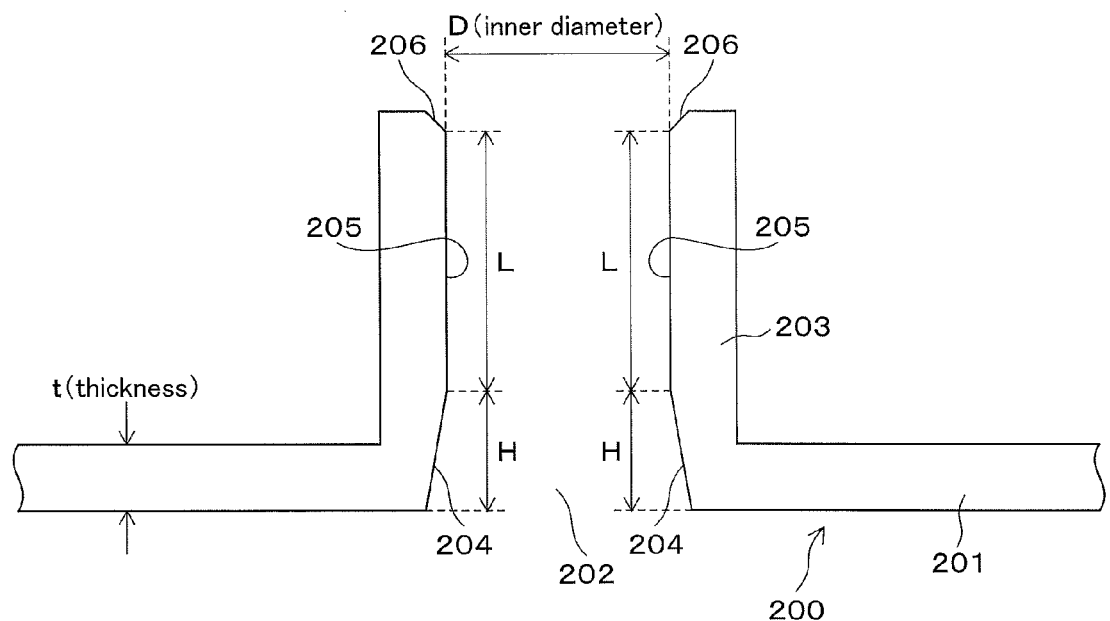
FIG. 3 is a cross sectional view showing a flange according to an embodiment of the present invention.

A flange 200 is formed by press-working a metal plate such as a steel sheet, and it has an approximately disk shape with a cylindrical portion at the center. FIG. 2 shows a cross sectional state viewed from a vertical direction to the axis in FIG. 1, and FIG. 3 shows a cross sectional state of the flange 200. The flange 200 has a tabular portion 201 that is a flat annular portion, and a cylindrical portion 203 that is integrally provided at the center of the tabular portion 201. The tabular portion 201 is a flat portion that is larger than an outer diameter of a cylindrical portion viewed from an axial direction. A circular hole 202 having an inner diameter D is formed at the center of the tabular portion 201, and the cylindrical portion 203 extends in an axial direction from an edge of this hole 202. Here, the inner diameter D is set to be slightly smaller than an outer diameter of the stator 101.

A clearance portion 204 is provided on an overlapped portion of the cylindrical portion 203 and the tabular portion 201 of the flange 200. The clearance portion 204 has a tapered shape in which an inner diameter is gradually expanded toward the outside in an axial direction (a lower direction in the figure). A length H in an axial direction of the clearance portion 204 is set to be not less than a thickness t of a plate member which constitutes flange 200 (that is, H≥t). A press-fitting effective portion 205 is formed on a portion that adjoins the clearance portion 204 in the cylindrical portion 203 in an axial direction. A length in an axial direction of the press-fitting effective portion 205 is L, and an outer periphery of the press-fitted stator 101 is contacted therewith. An end portion of the press-fitting effective portion 205, that is, an upper edge portion on the inside of the cylindrical portion 203 is a chamfered guide portion 206.

The resolver 100 is fixed to the flange 200 by press-fitting the outer periphery of the stator 101 to the inside of the press-fitting effective portion 205, and thereby a resolver assembly is configured. In this press-fitted state, a position of a lower edge of the clearance portion 204 agrees with a position of a lower edge of the stator 101.

As shown in FIG. 1, three screw holes 207 are formed on the tabular portion 201 of the flange 200. The flange 200 integrated with the resolver 100 is fixed to an apparatus, etc., by using the screw holes 207. Here, a shape, a number and a position of the screw holes 207 are not limited to those of the shown embodiment. In addition, a shape of the outer periphery of the flange 200 is not limited to a circle, and it may be a rectangle, an ellipse, or a polygon such as a hexagon, etc.

Assembly

First, the resolver 100 is assembled. Next, the stator 101 of the resolver 100 is press-fitted to the inside of the cylindrical portion 203 from a side of the guide portion 206. In this case, the press-fitting of the resolver 100 to the inside of the cylindrical portion 203 is easily carried out, since the guide portion 206 has a tapered shape in which an edge thereof is chamfered. The guide portion 206 may have an R surface shape or a stepped shape instead of the tapered shape.

Advantages

Since the resolver 100 can be mounted to the apparatus through the flange 200, standard products can be used as the resolver 100. Therefore, the production cost of the resolver 100 can be reduced. Then, in a state in which the resolver 100 is press-fitted to the flange 200, the press-fitting effective portion 205 of the cylindrical portion 203 can be deformed toward the outside. As a result, a situation in which strong stress, that is, stress that deforms the stator 101, is applied from the press-fitting effective portion 205 to the stator 101, can be avoided by this deformation.

In addition, by providing the clearance portion 204 in which the inner diameter is expanded, a thickness of the cylindrical portion 203 corresponding to the clearance portion 204 becomes relatively thin, and a structure that easily occurs above the deformation toward the outside of the press-fitting effective portion 205 can be realized.

Furthermore, in a state in which the resolver 100 is press-fitted to the flange 200, the portion corresponding to the clearance portion 204 is not contacted with the stator 101. The deformation in a radial direction substantially does not occur, since the overlapped portion with the tabular portion 201 viewed from a vertical direction to an axis of the clearance portion 204 has the tabular portion 201. Therefore, the overlapped portion with the tabular portion 201 viewed from a vertical direction to the axis is difficult to be deformed, as described above, in the case in which the clearance portion 204 is not provided, the inner diameter of the portion is D, and the portion is contacted with the stator 101. Thus, the excessive stress is applied toward the axial center of the stator 101, and the deformation of the stator 101 is easily generated.

Here, when H<t is satisfied, the overlapped portion with the tabular portion 201 viewed from a vertical direction to an axis which is difficult to be deformed, is contacted with the stator 101. Therefore, the excessive stress is easily applied to the stator 101, and the deformation of the stator 101 is easily generated.

Variations

Figure 4:
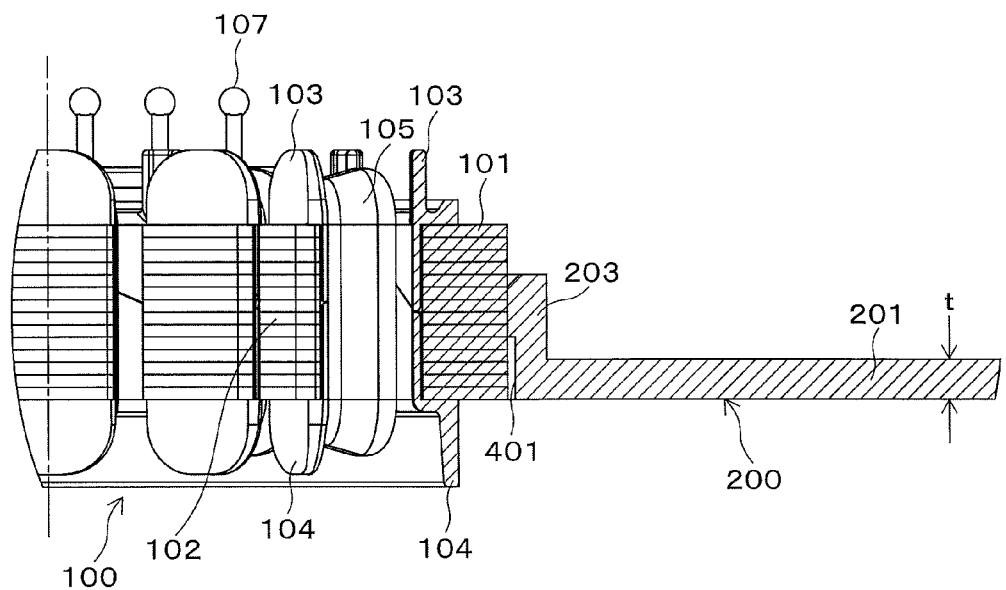
FIG. 4 is a cross sectional view showing a flange according to another embodiment of the present invention.
Figure 5:
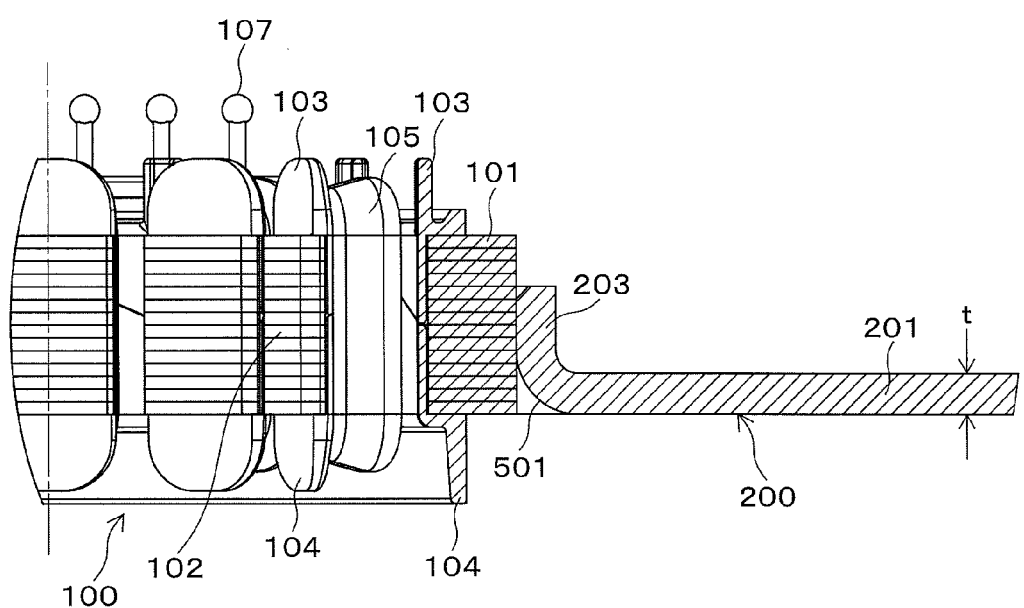
FIG. 5 is a cross sectional view showing a flange according to another embodiment of the present invention.

In FIGS. 2 and 3, a structure in which the clearance portion 204 has a tapered shape is described; however, the structure may be a structure shown in FIG. 4 having a clearance portion 401 in which an inner diameter is a fixed value by forming a step, or may be a structure shown in FIG. 5 having a clearance portion 501 in which a lower edge thereof has an R surface shape. In these cases also, the portion in which the inner diameter is expanded is set to be a size in which it is not overlapped with the tabular portion 201 viewed from a vertical direction to the axis. That is, a length in an axial direction of the step portion of the clearance 401 is set to be not less than a thickness t, and a radius R of the clearance portion 501 is set to be not less than the thickness t.

The embodiment of the present invention is not limited to each of the above embodiments and includes various modifications that may be anticipated by one skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof. Here, examples of the VR type resolver were explained; however, the types of resolver are not limited to these.

What is claimed is:

1. A resolver assembly, comprising:
a resolver having a stator; and
a flange in which the resolver is contained, the flange comprising:
   a cylindrical portion in which the stator is press-fitted to the inside thereof, and
   a tabular portion that is greater than an outer diameter of the cylindrical portion viewed from an axial direction and that is integrated with the cylindrical portion,
wherein a clearance portion having an expanded inner diameter that does not contact with an outer periphery of the stator is provided on an overlapped portion of the cylindrical portion viewed from a vertical direction to the axial direction and the tabular portion, and
a length in an axial direction of the clearance portion is greater than a thickness of the tabular portion.

2. The resolver assembly according to claim 1, wherein a chamfered guide portion is formed on an inner periphery of an opposite end of the cylindrical portion to a portion in which the clearance portion is provided.

3. The resolver assembly according to claim 1, wherein the clearance portion has a tapered shape in which an inner diameter gradually decreases in an extending direction of the cylindrical portion.

4. The resolver assembly according to claim 1, wherein the clearance portion has a round surface shape.

5. The resolver assembly according to claim 1, wherein the clearance portion has an enlarged diameter structure in which an inner diameter is a fixed value in an extending direction of the cylindrical portion.

* * * * *